June 24, 1924.
H. F. GORSUCH ET AL
1,498,962
BODY FOR WAGONS OR TRUCKS
Filed April 26, 1923
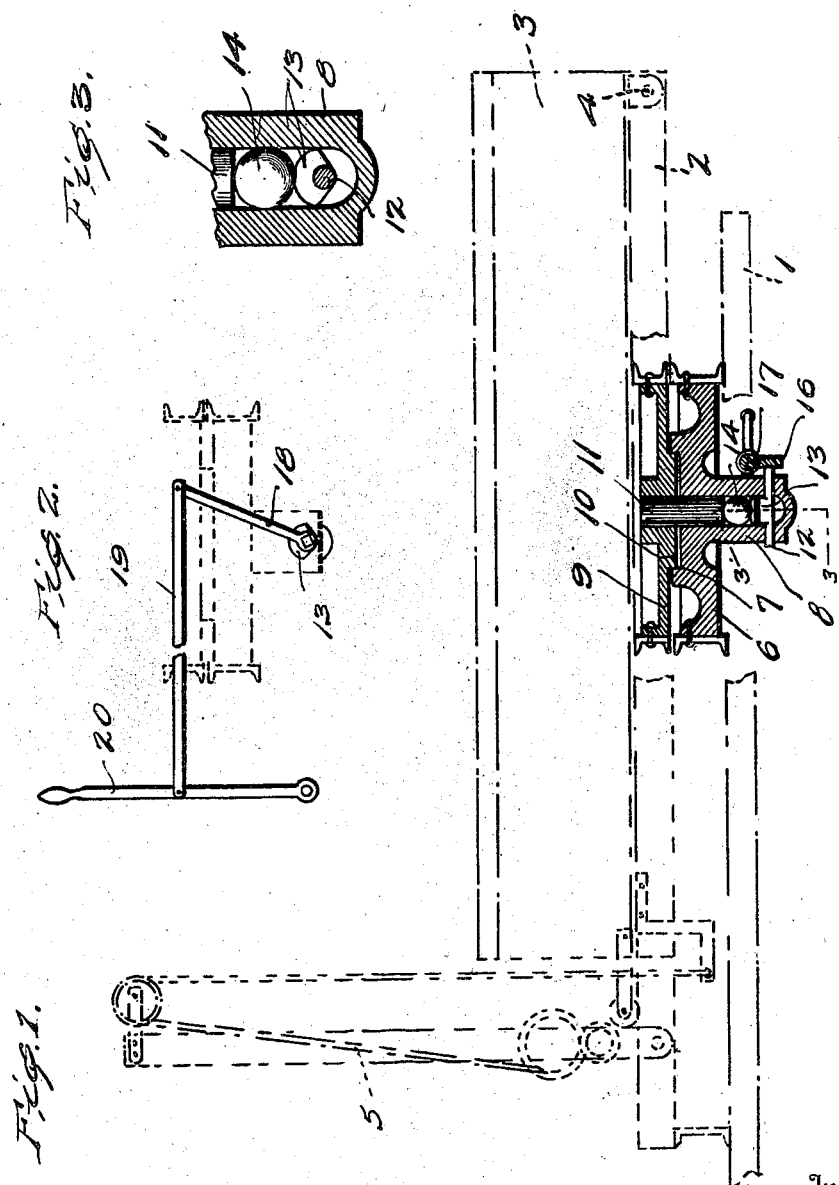
Inventor
Emil Wickstrom and
Howard F. Gorsuch
By Richard B. Owen,
Attorney
Witness Patented June 24, 1924.

1,498,962

UNITED STATES PATENT OFFICE.

HOWARD F. GORSUCH AND EMIL WICKSTROM, OF GALION, OHIO.

BODY FOR WAGONS OR TRUCKS.

Application filed April 26, 1923. Serial No. 634,853.

*To all whom it may concern:*

Be it known that we, HOWARD F. GORSUCH and EMIL WICKSTROM, citizens of the United States, residing at Galion, in the county of Crawford and State of Ohio, have invented certain new and useful Improvements in a Body for Wagons or Trucks, of which the following is a specification.

The present invention relates to a body for wagons or trucks and has for its principal object to provide means whereby the body of a truck or wagon may be rotated in respect to the chassis of the truck or wagon as may be desired. The invention is designed primarily for use with dump wagons so that the contents of the wagon may be delivered very conveniently to desired places.

Another important object of the invention is to provide means whereby a wagon body may be slightly raised so as to be supported by a spherical bearing whereby it may be revolved to desired positions with considerable ease.

With the above and numerous other objects in view as will appear as the description progresses, the invention resides in certain novel features of construction, and in the combination and arrangement of parts as will be hereinafter more fully described and claimed.

In the drawing

Figure 1 is a section through the operating mechanism showing the necessary portions of the truck in dotted lines, Figure 2 is an elevation of the operating mechanism therefor, and Figure 3 is a detail section on an enlarged scale taken substantially on the line 3—3 of Figure 1.

Referring to the drawing in detail it will be seen that 1 designates the chassis of a truck or wagon upon which is mounted the platform 2 which supports the dump body 3. This dump body 3 is pivoted at 4 to the platform 1 and is actuated by any desirable mechanism such as is indicated at 5. The parts of the invention thus far described are more or less of conventional construction and may be varied to suit occasions. Our invention consists particularly in the structure shown in full lines in the drawing. A stationary disk 6 is suitably mounted on the chassis 1 and the upper face thereof is formed with a depression 7 of annular formation and centrally disposed in this depression is a pocket 8 which extends a distance below the disk. A revolving plate 9 is mounted above the stationary disk 6 and is provided with a projection 10 of annular construction adapted to seat in the depression 7. A bolt 11 projects from the plate 9 centrally thereof through the projection 10 into the pocket 8 extending a distance therein. A shaft 12 is journaled in the bottom portion of the pocket 8 and has formed thereon a cam member 13. A spherical bearing member 14 rests upon this cam member 13 and the bolt 11 rests upon this spherical member 14. By actuation of the shaft 12 the cam 13 may be rotated so as to raise or lower the spherical bearing member 14 and also the bolt 10 thereby raising the plate 9. This plate 9 is secured to the platform 2 and therefore the platform 2 and the body 3 will likewise be raised. In Figure 1 we have shown the plate 9, platform 2 and body 3 in the raised position.

A worm gear 16 is keyed to the outer end of the shaft 12 and is in mesh with a worm 17 which is actuated by a crank 18. This crank 18 is located to the side of the truck and a link rod 19 is attached to the end thereof and also intermediately of an operating lever 20 which is conveniently positioned on the truck.

It will be seen that by actuation of this lever 20 the cam may be rotated for lifting the platform so that it may be easily revolved since it is practically supported upon the bolt 11 engaging the spherical bearing member 14.

Numerous changes in the details of construction and in the combination and arrangement of parts may be resorted to without departing from the spirit of the invention as hereinafter claimed.

Having thus described our invention what we claim as new is:—

1. A mechanism of the class described including a stationary bottom member normally resting on the stationary body member, a rotatable upper member, said bottom stationary member provided with a pocket, a bolt extending from the upper member into said pocket, a spherical member in said pocket normally out of engagement with the bolt, and means for raising the spherical member so as to engage the bolt and raise the upper member whereby said upper member may be easily revolved.

2. In combination, a chassis, a platform, a member fixed to said chassis, another member fixed to said platform and adapted to rest on the first member, said first member provided with a pocket, a bolt projecting from the second member into said pocket, a spherical bearing member in the pocket normally out of engagement with the bolt, and means for raising the spherical bearing member against the bolt and spacing the members apart whereby the platform may be revolved in relation to the chassis in the manner and for the purpose specified.

3. In combination, a chassis, a platform, a member attached to the chassis, a second member attached to the platform, said first member adapted to support said second member, said first member provided with a pocket, said second member provided with a bolt projecting in said pocket, a spherical bearing member in said pocket abutting the end of said bolt, a cam in said pocket, means for actuating the cam so as to raise the spherical member and separate the first two members from each other whereby the platform may be easily rotated in respect to the chassis all in the manner and for the purpose specified.

In testimony whereof we affix our signatures in presence of two witnesses.

HOWARD F. GORSUCH.
EMIL WICKSTROM.

Witnesses:
GOTTLIED KUEHLER,
JAMES R. CALDWELL.